United States Patent [19]
Stich

[11] Patent Number: 6,122,135
[45] Date of Patent: Sep. 19, 2000

[54] DISK DRIVE WITH VOICE COIL MOTOR RISE TIME MANAGER

[75] Inventor: Michael Charles Stich, Rochester, Minn.

[73] Assignee: Western Digital Corporation, Irvine, Calif.

[21] Appl. No.: 08/994,475

[22] Filed: Dec. 19, 1997

[51] Int. Cl.$^7$ .................................................. G11B 5/596
[52] U.S. Cl. ..................... 360/78.09; 360/78.04
[58] Field of Search ............................... 360/78.09, 78.04

[56] References Cited

U.S. PATENT DOCUMENTS

| 4,914,644 | 4/1990 | Chen et al. | 369/43 |
| 5,898,286 | 4/1999 | Clare et al. | 318/569 |

*Primary Examiner*—Paul Loomis
*Assistant Examiner*—Dau I. Davidson
*Attorney, Agent, or Firm*—Milad G. Shara

[57] ABSTRACT

A method to adaptively reduce error introduced by the coil current rise time. A disk drive with a moving arm actuator driven by a voice coil motor is controlled by periodically modeling the coil current rise time. An adjustment to a commanded current value is based on the model of the coil current rise time and a magnitude change in commanded value. The model of the coil current is based on a linear approximation to the exponential rise time of the coil current. The commanded value is adjusted to compensate for the error in the control effort. For small commanded value differences no compensation is made for the coil current rise time. For medium command value differences a slope intercept equation is used to compute the compensated commanded value. For large commanded value differences half of an estimate of the maximum largest physical current change is used. The adjustment is made by the estimator in a position error signal feedback control system. The voice coil rise time adjustment is made to a voice coil motor control signal. The actuator velocity estimate is also improved with the model of the coil current rise time.

28 Claims, 9 Drawing Sheets

DISK DRIVE WITH VOICE COIL MOTOR RISE TIME MANAGER

FIELD OF THE INVENTION

The invention relates to a disk drive having a method and apparatus to manage voice coil motor rise time and more particularly to a method and apparatus for controlling the drive current in a voice coil motor in a disk drive actuator.

BACKGROUND OF THE INVENTION

Disk drives often employ voice coil motor driven actuators to move one or more read/write heads over data storage media. The voice coil motor, VCM, is constructed from a voice coil that provides the force necessary to move the actuator. Moving the actuator and thus the read/write heads to a new position is known as a seek.

The voice coil varies a magnetic field in the proximity of a permanent magnet. The magnetic field varies in proportion to the VCM coil current. A microprocessor executes an actuator control program including an estimator that controls the current to the VCM through a current driver. A position error signal provides feedback to the estimator from the actuator. When the disk drive seeks to a new location the controller provides a command to change the motor current. The time required for the current to reach the commanded level is known as the voice coil motor current rise time.

Drive performance is affected by the time required to seek to a new location on the storage media. The faster the seek, the higher the performance of the drive. One of the main problems with executing a fast seek in the present disk drive actuator control systems is the rise time of the voice coil current. Because the design of the actuator VCM requires that a coil of wire be placed in a permanent magnetic field to generate the force required to move the actuator, the coil of wire has inductance which characteristically resists changes in current in the coil. The current driver tries to force the current in the coil to the commanded value. However the inductance of the coil prevents the change in current from happening instantly and an exponential rise in current occurs whose rate depends on the impedance of the coil, the power supply voltage, and the back emf voltage.

In the disk drive the estimator is designed to implement a control law. The estimator, based in part on voice coil motor current, tries to estimate the control effort required to position the actuator to the desired location. In the prior art, the control effort input is not accurate for the estimator because of the rise time of the coil current. With an uncompensated estimator, where the control law does not take into account the voice coil rise time, the effective current actually applied to the actuator is not the calculated value. When the rise time of the coil current constitutes an unmodeled characteristic, prior art control algorithms have assumed that the current driver of the VCM is successful in driving the commanded coil current into the coil instantaneously.

One of the physical effects of changing the coil current is the saturation mode of the current driver. Large current changes cause saturation of the current driver which introduce non-linearity in system response. This saturation may cause control problems.

Systems that model the voice coil motor current based on actuator velocity, such as U.S. Pat. No. 4,914,644 entitled "Disk File Digital Servo Control System with Coil Current Modeling" to Chen et al., do not take into account a magnitude of the change in commanded current required in a sample period. The prior art provides a simple model of rise time that does not take into account the complex physical characteristics of the voice coil motor and bases the current model either on a saturation update or a linear prediction update based on actuator velocity. The prior art also does not base control of the drive current on relative magnitude changes in commanded current.

In the prior art, saturation, rise time, and back emf effects are either ignored entirely or are modeled by a constant, and the control algorithms assume that full current is reached immediately by the power driver. This may be a good approximation for small changes in the requested current. However, during seek, large current changes are required as quickly as possible to minimize the seek and settle times. In this case the saturation, rise time, and back emf effects are significant, giving rise to errors in the coil current estimate. As tracks narrow, the gain applied to the coil current in the control algorithm must increase. Thus errors in the position and velocity calculation become larger proportions of a track. These errors cause longer settle times. The voice coil current rise time also causes errors in the residual signal, the residual signal is the difference between what the estimator predicted the position error signal would be and what was actually measured during the next servo sample period.

What is needed is a hard disk drive with an estimator that reduces error in voice coil current rise time based on the magnitude of the change in commanded current.

SUMMARY OF THE INVENTION

The invention provides a disk drive that adaptively reduces error caused by the coil current rise time. The disk drive comprises an actuator with a voice coil motor, the voice coil motor having a coil of wire located in a magnetic field moves the actuator. The disk drive further has a servo controller with an estimator and a current driver to generate a control effort to move the actuator. The coil of wire has an impedance which slows changes in current in the coil. The coil current has an associated rise time. The current driver of the actuator tries to force current in the coil to a commanded value. The control effort has an error caused by the coil current rise time. The disk drive further has a microprocessor servo control system that implements a method to adaptively reduce error caused by the coil current rise time by periodically modeling the coil current rise time. The disk drive calculates a change in the commanded value during a sample period. The disk drive adjusts the commanded value based on the periodic modeling of the coil current rise time and a magnitude of the change in the commanded value during the sample period to compensate for error in the control effort caused by the coil current rise time.

The invention further provides a method to change a commanded value of current to the voice coil having the steps of computing a model limit based on the actuator velocity; comparing the model limit to a commanded value; computing an effective change in commanded value based on the model limit if the model limit is less than the absolute value of the commanded value; computing an effective change in commanded value based on the difference between the commanded value and a current value for a prior sample; and setting the effective change in commanded value based on a model of the voice coil motor if the effective change in commanded value is greater than a predetermined current threshold and less than a maximum possible change in coil current.

DETAILED DESCRIPTION OF THE PREFERRED EMBODIMENT

Figure 1:
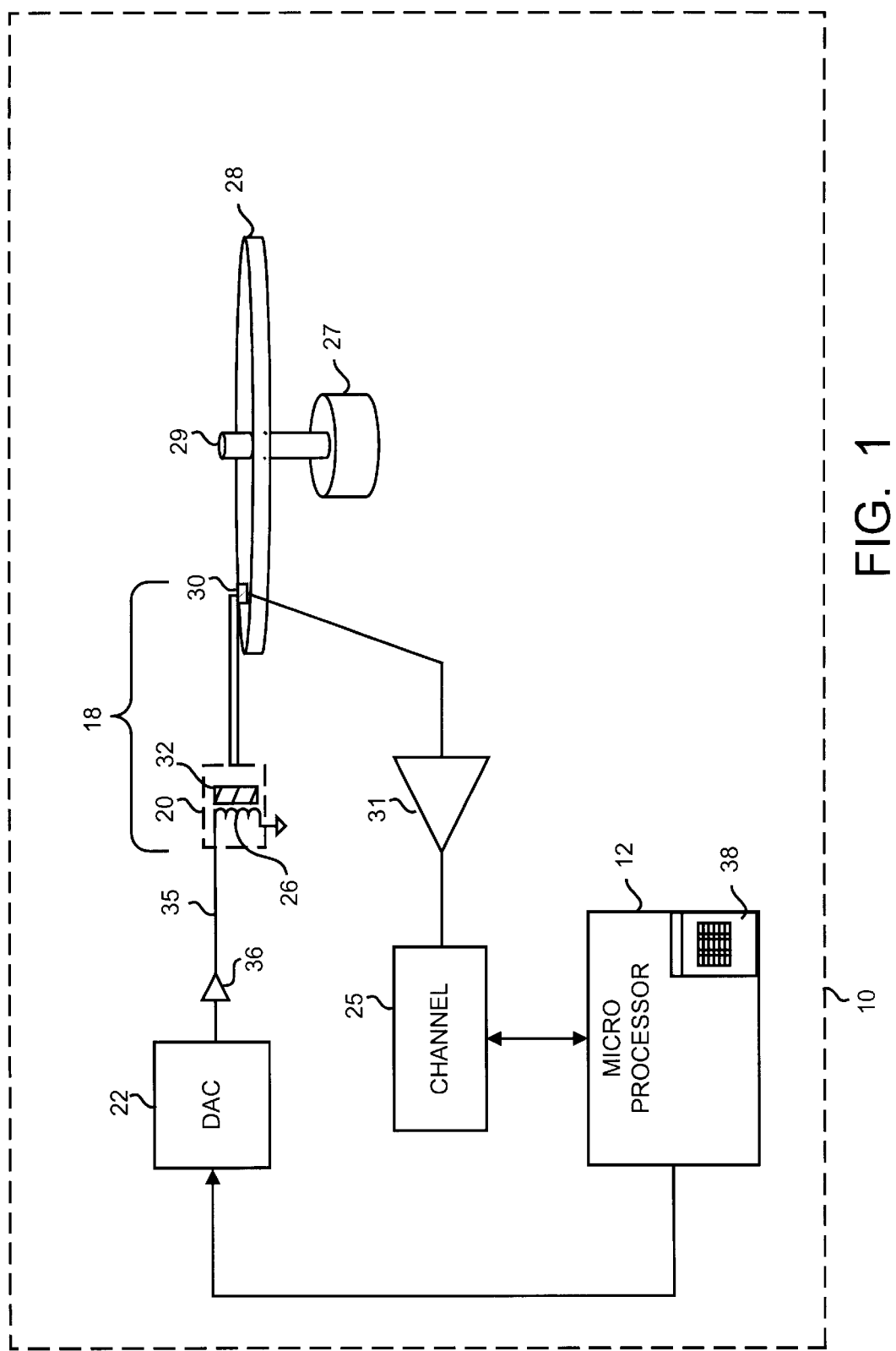
FIG. 1 shows the disk drive of the invention.

Refer now to FIG. 1 which shows a disk drive 10 with a voice coil motor driven actuator. The disk drive 10 may be a magnetic hard disk drive. The disk drive 10 reads and writes data to the storage media 28. The storage media 28 may be magnetic storage media which is mounted on spindle 29 for rotation by spindle motor 27. Actuator 18 moves read/write heads 30 across the storage media 28 in response to commands from a host, not shown. Voice coil motor 20, VCM 20, comprising voice coil 26, provides the force necessary to move the actuator 18. The voice coil motor 20 employs a voice coil 26 that varies a magnetic field in the proximity of a permanent magnet 32. The magnetic field varies by changing the VCM coil 26 current. Microprocessor 12, implementing a servo controller program, executes an estimator 38 control loop program, to control the current to the VCM 20 through digital-to-analog converter DAC 22 and current driver 36. In one embodiment of the invention, the microprocessor 12 is a TMS320 microprocessor. Current driver 36 provides current to the VCM 20 though line 35. Microprocessor 12 receives servo position information read by head 30 from media 28. The position information is amplified by pre-amplifier 31 and demodulated by servo channel 25 in a well known manner.

Figure 2:
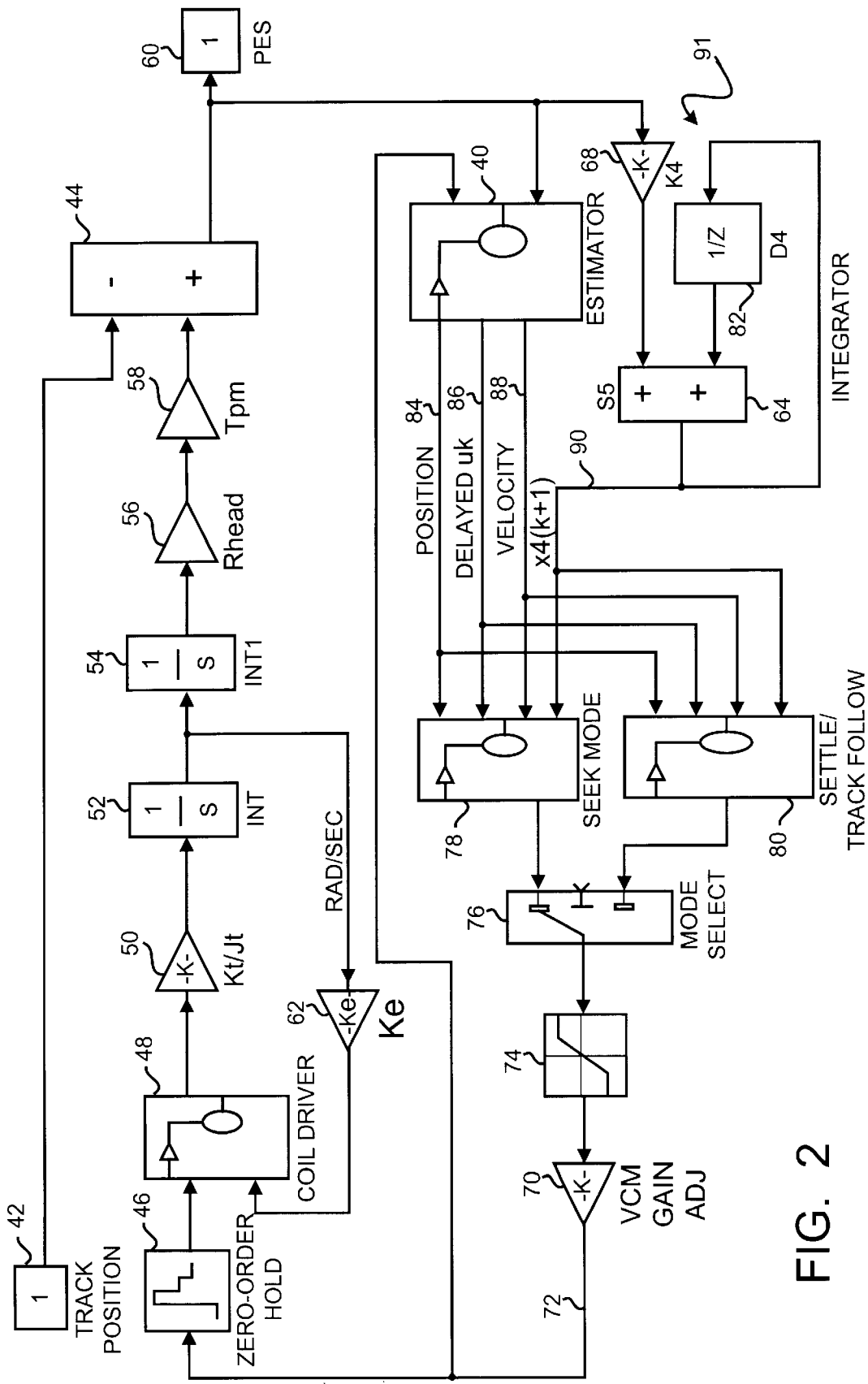
FIG. 2 shows a schematic diagram of the estimator of the invention.

Refer now to FIG. 1 and FIG. 2. FIG. 2 shows the estimator 40 of the invention in a system control loop that schematically represents the operation of the invention. The actuator 18 is modeled by two integrators 52 and 54 in a well known manner. The angular velocity of the actuator 18 in rad/sec from integrator 52 is provided to converter node 62 to convert angular velocity to volts, modeling the back emf of VCM 20. This converted signal is fed back to the coil driver 48. Coil current from coil driver 48 is sent to node 50.

Integrator 54 provides a signal representing the displacement of the actuator 18 that is scaled to meters by a scaling factor in node 56. Node 58 converts meters into tracks to be input, as an actual track position, to summer 44. The desired track position 42 is subtracted in summer 44 from the actual track position to provide a difference which represents the position error signal (PES) 60. The actual track position represents the location of the read/write head from the servo system and is produced in a well known manner. Position error signal 60 is used by the servo system of the disk drive 10 to adjust for position error, also in a well known manner. The position error signal 60 is provided to the estimator 40.

A VCM control signal from VCM gain adjust stage 70 is also provided to the estimator 40. The estimator 40 uses these two signals to provide three control signals, a position prediction signal 84, a delayed control signal 86, and a velocity signal 88. These signals are then provided along with a bias signal 90 to signal processing nodes 78 and 80. The bias signal 90 models bias forces such as windage. The bias signal is generated by integrator 91 comprising a feedback to integrator 82 from the output of a summation node 64 that sums a scaled version, through node 68, of the position error signal.

Mode select switch 76 selects the raw control signal from either the seek mode signal processor 78 or the settle/track follow mode signal processor 80 depending on whether the disk drive 10 is currently in a seek mode or track following mode. The raw control signal is then provided to a limiting saturation node 74 and provided to VCM gain adjust stage 70. The control output 72 of the VCM gain adjust stage 70 is provided both to the estimator 40 and a zero order hold 46. The output of the zero order hold 46 is provided to a coil driver 48. The coil driver 48 provides the VCM coil 26 current.

The method of the invention reduces the errors introduced by the coil current rise time. This rise time effect can be modeled using off-line simulation programs such as "MATLAB™", available from The Mathworks Inc., by using variable step integration methods with automatic error control. Fourth or fifth order Runge-Kutta methods may be used, especially where non-linearities are involved. If a full simulation of the rise time were implemented in the VCM control code, the system would require a high sample rate and a complex integration algorithm to deal with the non-linearity of the driver system, including those caused by voltage saturation. Additionally, an accurate model of the coil 26 would require computationally expensive operations, such as natural logarithms and exponential functions.

The invention therefore reduces the need for such computationally expensive operations by simplifying the model of the rise time from an exponential to a straight line, and by approximating the saturation effects. This brings the computation burden down to the range where the model can be put into the actuator control program and computed every sample period. The model of the rise time can be used both in the estimator 40 to improve the accuracy of the position prediction signal 84 and velocity signal 88, and in the control law to modify the control effort to more closely match the calculated value after rise time effects are taken into account.

Figure 3:
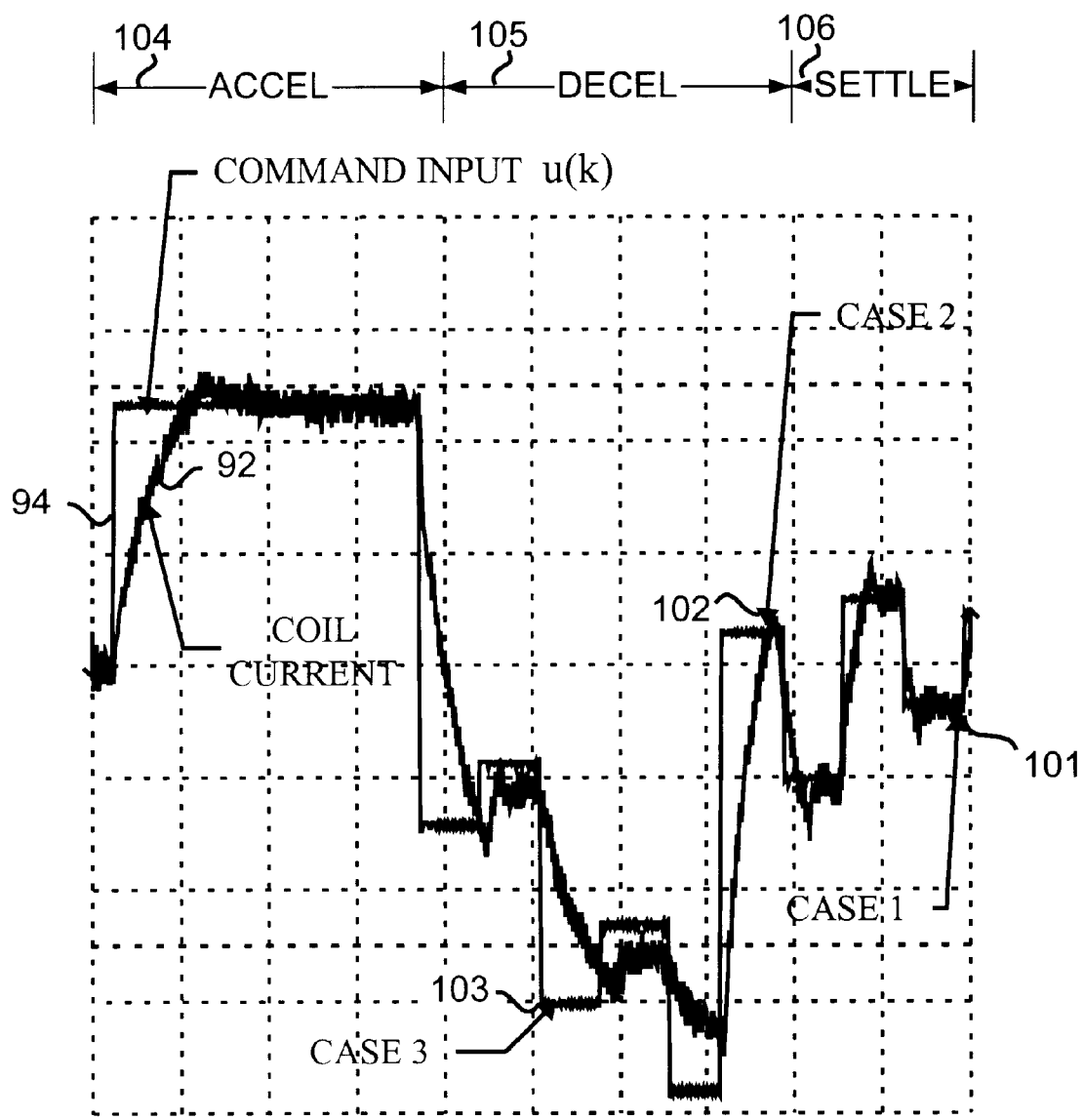
FIG. 3 shows a plot of command input and coil current versus time.

FIG. 3 shows a short seek, illustrating the coil current 92 as a function of time along with the commanded input 94 to the driver circuit. The seek has three phases: the acceleration phase 104, the deceleration phase 105 and the settle phase 106. The exponential rise times of the current 92 are clearly visible, illustrating the associated delay from when the current is commanded to when the current is actually available in the coil 26.

The invention distinguishes between three magnitudes of change in coil current in relation to a theoretical maximum change that may be effected in coil current in one servo sample period. The coil current can only be changed by a maximum amount in a given time period. The difference between a current value of coil current and the value of coil current that corresponds to a new position is known as the commanded difference in coil current. Case 1 101 shows a small commanded difference. A small commanded difference is approximately 10% to 15% of the maximum possible change. Case 2 102 shows a medium commanded difference which is greater than an approximately 10% to 15% possible change, up to the maximum possible change. Case 3 102 shows a large commanded difference that is greater than the maximum possible difference.

The coil current as a function of time when starting from zero driven by the power supply voltage is given by the following equation. This equation is the solution to the differential equation for the resistor-inductor circuit describing the electrical dynamics of the VCM coil 26. The equation models the coil current at the output of the coil driver 48.

$$u(t) = \frac{2048}{1.1 g_m} \cdot \frac{(V_{ps} \pm K_e \omega)}{R}(1 - e^{-t/\tau}) = ULimV(1 - e^{-t/\tau})$$

The symbols are defined as follows.

| | |
|---|---|
| $V_{ps}$ | power supply voltage (Volts) |
| $K_e$ | back emf constant (Volts/rad/sec) |
| $\omega$ | actuator velocity (rad/sec) |
| R | VCM coil resistance (ohms) |
| $g_m$ | driver transconductance (Amps/volt) |
| 2048/1.1 | 12 Bit Digital to Analog Converter, DAC gain (bits/volt) |
| $\tau$ | coil rise time (seconds) |

ULimV, the limit of u(t) as a function of voltage, is the maximum attainable value of the coil current for this sample period based on the velocity of the actuator. ULimV represents the maximum value that u(t) can physically obtain, taking into account the power supply voltage and the back emf of the coil. The units of u(t) are in digital to analog converter, DAC, bits output which have a direct correspondence to voice coil current. The full time equation of the current response to a step input to the current driver from $u_a(k)$ to $u_a(k-1)$ is $$u_a(t) = (\pm ULimV - u_a(k-1))(1 - e^{-t/\tau}) + u_a(k-1) \qquad (0)$$

This equation models the coil current but is scaled to match the control output 72 to the zero order hold 46 and estimator 40. The equation applies until the value of $u_a(t)$ reaches the commanded value, $u_a(k)$ after which time the coil driver 48 maintains the commanded value. Consider the current for one sample time only in light of the three cases described above. They are labeled in FIG. 3 and assume that the sample rate of the control system is $T_s$. In one embodiment of the invention, the sample rate of the control system is the servo sample rate.

Case 1 101:

The change $u_a(k)-u_a(k-1)$ is small, less than ten to fifteen percent of the maximum possible change in commanded value, and the time to reach the final value is small relative to $T_s$.

Case 2 102:

The change $u_a(k)-u_a(k-1)$ is medium, from ten to fifteen percent of the maximum possible change up to the maximum possible change of commanded value, and the time to reach final value is less than $T_s$ but not negligible.

Case 3 103:

The change $u_a(k)-u_a(k-1)$ is large, greater than the maximum possible change and the final value is not reached before $T_s$.

To understand the effects of the various cases, an approximation to the exponential rise time of the coil current is used. This is a linear approximation and does not require the use of exponentials in the control processor 12.

$$u_a(t) = t \cdot slope + u_a(k-1) + b$$

The slope, and offset b, can be determined empirically or calculated from the parameters of the VCM. To determine where the current reaches the commanded value, designate to as the time point where the current reaches the commanded value.

$$u_a(t_o) = t_o \cdot slope + u_a(k-1) + b = u_a(k)$$

Where it is assumed that $u_a(k) > u_a(k-1)$ and $t_0$ is the time point where the straight line approximation reaches the commanded value. If $u_a(k) < u_a(k-1)$, indicating that the previous value from the zero order hold 46 is greater than the current value, then the signs on slope and b should both be negative. A minimum value for $t_0$ is selected, below which the rise time will be considered to have no effect. In one embodiment of the invention the minimum value selected is $T_s/6$. A value of $\Delta u_{min}$ can be calculated which is the minimum change in u(k) that is needed to take the rise time into account.

$$\Delta u_{min} = \frac{T_s}{6} \cdot slope + b \qquad (1)$$

The value of $\Delta u_{max}$ is that which will cause the VCM driver to be saturated for the full sample time. For this case the current will never reach the commanded value for this sample.

$$\Delta u_{max} = T_s \cdot slope + b \qquad (2)$$

If the change is between these limits, calculate the value of to where the current reaches the commanded value.

$$t_0 = \frac{|u_a(k) - u_a(k-1)| - b}{slope} = \frac{|\Delta u(k)| - b}{slope}$$

Once $t_0$ is found, then calculate a weighted average of $\Delta u$ to use in the control calculations as a better approximation of the control effort.

Use the full $\Delta u$ for the time after $t_0$ up to $T_s$, and half $\Delta u$ for the time before $t_0$.

$$\Delta u_{eff} = \frac{\frac{\Delta u(k)}{2} t_0 + \Delta u(k)(T_s - t_0)}{T_s}$$

$$= \Delta u(k)\left(1 - \frac{1}{2T_s} t_0\right)$$

It is possible to simplify this even further by removing the $t_0$ from the equation. This makes the correction dependent on $\Delta u$ and some constants.

$$\Delta u_{eff} = \Delta u(k) \left(1 - \frac{1}{2T_s}\left(\frac{|\Delta u(k)| - b}{slope}\right)\right) \quad (3)$$

$$= \frac{\Delta u(k)}{2T_s slope}(2T_s slope + b - |\Delta u(k)|)$$

Thus the effective change in the coil current is something less than the commanded change for this case. The invention may be used to improve the velocity estimate of the actuator based on the model of the coil current rise time.

Case 1 101:

The change is small, $\Delta u(k) < \Delta u_{min}$ so use the full $\Delta u(k)$, no modification is required.

Case 2 102:

The change is medium, use $\Delta u_{eff}$ from equation (3).

Case 3 103:

The change is large, use half of $\Delta u_{max}$ from equation (2).

In the numerical calculation and scaling of ULimV the value of ULimV needs to be in units equivalent to u(k), which is bits input to the D/A converter. Also, the velocity input to the back emf calculation needs to be in tracks/sector. To convert from tracks/sector to radians/second apply the following conversion constants.

$$\hat{x}_2 \cdot \frac{1}{radius} \cdot \frac{1}{39.37} \cdot \frac{1}{Tpi} \cdot \frac{1}{T_s} = \omega \text{ (radians/ second)}$$

Where

| radius | pivot to head gap radius | .0522 | meters |
|---|---|---|---|
| Tpi | tracks per inch (servo tracks) | 11250 | tracks/in |
| Ts | Sample time | 138.8e − 6 | seconds |

This simplifies to $$\hat{x}_2 \cdot 0.3116 = \omega$$

Multiplying by $K_e$ to get the required term $$K_e\omega = 0.0376\hat{x}_2$$

Therefore the second term of ULimV is $$\frac{K_e\omega}{R} \cdot \frac{2048}{1.1g_m} = \frac{.0376\hat{x}_2}{R} \cdot \frac{2048}{1.1g_m} = (.002721) \cdot 2048\hat{x}_2 = 5.572 \cdot \hat{x}_2$$

The first term is $$\frac{V_{ps}}{R} \cdot \frac{0248}{1.1g_m} = 1790 \quad (12 \text{ volts}, R = 10.5\Omega)$$

So in driver bits, $$ULimV = 1790 \pm 5.572\hat{x}_2$$

To select the proper sign,

| $\hat{x}_2 > 0$ | & | u(k) > 0 | −05.572 | ($K_e\omega < 0$) |
|---|---|---|---|---|
| $\hat{x}_2 < 0$ | & | u(k) < 0 | +05.572 | ($K_e\omega < 0$) |
| $\hat{x}_2 > 0$ | & | u(k) < 0 | +05.572 | ($K_e\omega > 0$) |
| $\hat{x}_2 < 0$ | & | u(k) > 0 | −05.572 | ($K_e\omega > 0$) |

The slope and b value used in the above calculations is an approximation of the exponential. The slope is, most generally a function of the previously commanded current, the present velocity, and time. Differentiating equation (0) to obtain the general slop provides:

$$\frac{du_a(t)}{dt} = \frac{1}{\tau}[\pm ULimV - u_a(k-1)]e^{-t/\tau}$$

Evaluating the slope and intercept b at, $T_s/2$ with $\tau = 0.9T_s$ and $u_a(k-1) = 0$ and at zero velocity, however, provides a calculated slope as $$\left.\frac{du_a(t)}{dt}\right|_{t=\frac{T_s}{2}} = \frac{e^{-T_s/2/.9T_s}}{.9T_s}(1790) = \frac{.5738}{.9T_s}(1790) = \frac{.6375}{T_s}(1790) = \frac{1141}{T_s}$$

and a calculated b as $$b = 0.1*[\pm ULimV - u_a(k-1)] \approx 0.1\%[\pm ULimV]$$

is a tunable parameter chosen graphically as an approximation.

These variables are generally calculated on the previous sample. Since ULimV depends on velocity, the previous velocity can be used or a prediction of the velocity at the next sample time can be made. Using these calculated values at each sample time, however, would only require a division by the slope variable in the calculation of $\Delta u_{eff}$ in equation (3) at each sample time.

Figure 4:
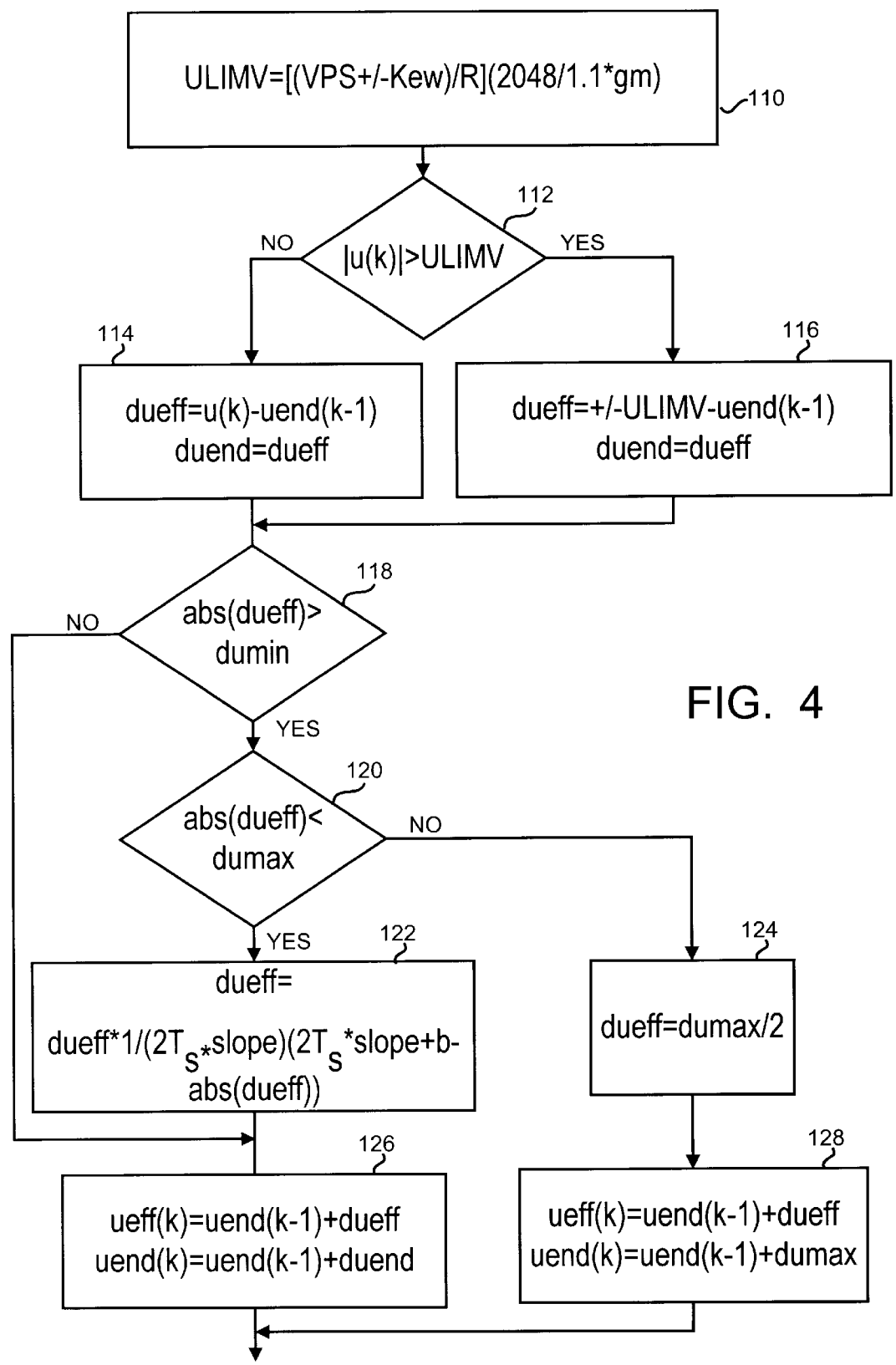
FIG. 4 shows a flow diagram of the method of the invention to control voice coil motor current rise time.

Refer now to FIG. 4 which shows the method of the invention to calculate updated control signals in the estimator 40. In step 110 a value of ULimV is calculated based on, $V_{ps}$, the power supply voltage (Volts), $K_e$, the back emf constant (Volts/rad/sec), $\omega$, the actuator velocity (rad/sec), R, the VCM coil 26 resistance (ohms), $g_m$, the driver transconductance (Amps/volt), a constant, 2048/1.1, which represents the digital to analog converter gain for a 12 bit signed conversion (bits/volt), and, $\tau$, the coil rise time (seconds). The value of ULimV depends on the varying actuator velocity.

The process then flows to step 112 to check if the absolute value of u(k), the commanded current value, is greater than ULimV, from the electrical dynamic model of the VCM coil current. The absolute value of u(k) provides a magnitude of the commanded current value. Depending on the sign convention a positive u(k) will either move the actuator in and a negative u(k) will move the actuator out, or visa versa. The magnitude of u(k) is checked against ULimV because ULimV is the maximum attainable value of the coil current for this sample period based on the velocity of the actuator. If the absolute value of u(k) is greater than ULimV, which means that more current is commanded than can be provided, then the process flows to step 116. If the absolute value of u(k) is less than or equal to ULimV, which means that the system will be able to attain the commanded value, then the process flows to step 114. The value u(k) is the value of the continuous u(t) function taken at the sample period of the system. u(k+1) is the next sample of u after u(k).

In step 114 a change in the effective commanded value, delta u(k) effective, also known as the dueff variable, is calculated as the difference between the commanded value, u(k), and the ending commanded value from the previous sample period, uend(k−1). The ending commanded value, uend(k−1), from the previous sample period is set in either step 126 or step 128. The change in the u(k) ending value, delta u(k) ending value, also known as the duend variable, is set to dueff. In step 116 the dueff variable is set to either plus or minus the ULimV model value minus uend(k−1) and the duend variable is set to dueff. The proper sign to apply in step 116 to ULimV depends on the voltage polarity of the control signal u(k). In this way the invention computes a change from the current value to the commanded value. The size of the commanded change in the voice coil current value to the commanded value will be used to determine the proper adjustment to the ending u(k) value, uend(k).

The process then flows to step 118 to check if the change in the commanded voice coil current, dueff, is less than a minimum, dumin, by checking if the absolute value of dueff is greater than dumin. In one embodiment of the invention with a 12 bit DAC, the dumin value is chosen to be approximately 654. If the absolute value of dueff is less than a minimum, then the process flows to step 126. This condition is also known as Case 1 101, where the change in commanded voice coil current is small. If in step 118 the condition is true, then the process flows to step 120. In step 120 a check is made to determine if the change in the control current is less than a maximum, dumax, by checking if absolute value of dueff is less than dumax. Dumax is computed based on equation 2. In one embodiment of the invention with a 12 bit DAC, the value of dumax is chosen to be approximately 3029. If the condition in step 120 is true the process flows to step 122, also known as Case 2 102, where the change in commanded voice coil current is of medium magnitude. If the condition in step 120 is false, then the process flows to step 124, also known as Case 3 103, where the change in commanded voice coil current is large.

In step 124 Case 3 103 is handled, dueff is set to dumax divided by two. This sets the delta u(k) effective current to half of the maximum amount of current physically possible to change. Half of dumax is the average of the range. From step 124 the process flows to step 128 to set ueff(k) to the ending current from the previous sample period, uend(k−1) plus the newly computed delta u(k) effective, dueff. The ending value of u(k), uend(k), is also set in step 128 to the previous sample period ending value of u(k), uend(k−1), plus the maximum possible current, dumax.

In step 122 Case 2 is handled, dueff, is set to the linear estimate of delta u(k) effective. Delta u(k) effective is computed according to the following equation:

$$\Delta u_{eff} = \Delta u(k)\left(1 - \frac{1}{2T_s}\left(\frac{|\Delta u(k)| - b}{slope}\right)\right)$$

$$= \frac{\Delta u(k)}{2T_s slope}(2T_s slope + b - |\Delta u(k)|)$$

where dueff equals the previously computed dueff divided by two times the sample time times the model slope, whose derivation is given above, times the quantity of two times the sample time times the slope plus the modeled intercept, whose derivation is given above, minus the previously computed dueff.

From step 122 the process flows to step 126 to set ueff(k) to the ending current from the previous sample period, uend(k−1) plus the newly computed delta u(k) effective, dueff. The ending value of u(k), uend(k), is also set in step 126 to the previous sample period ending value of u(k), uend(k−1), plus the initially computed delta u(k) effective, dukend.

Figure 5:
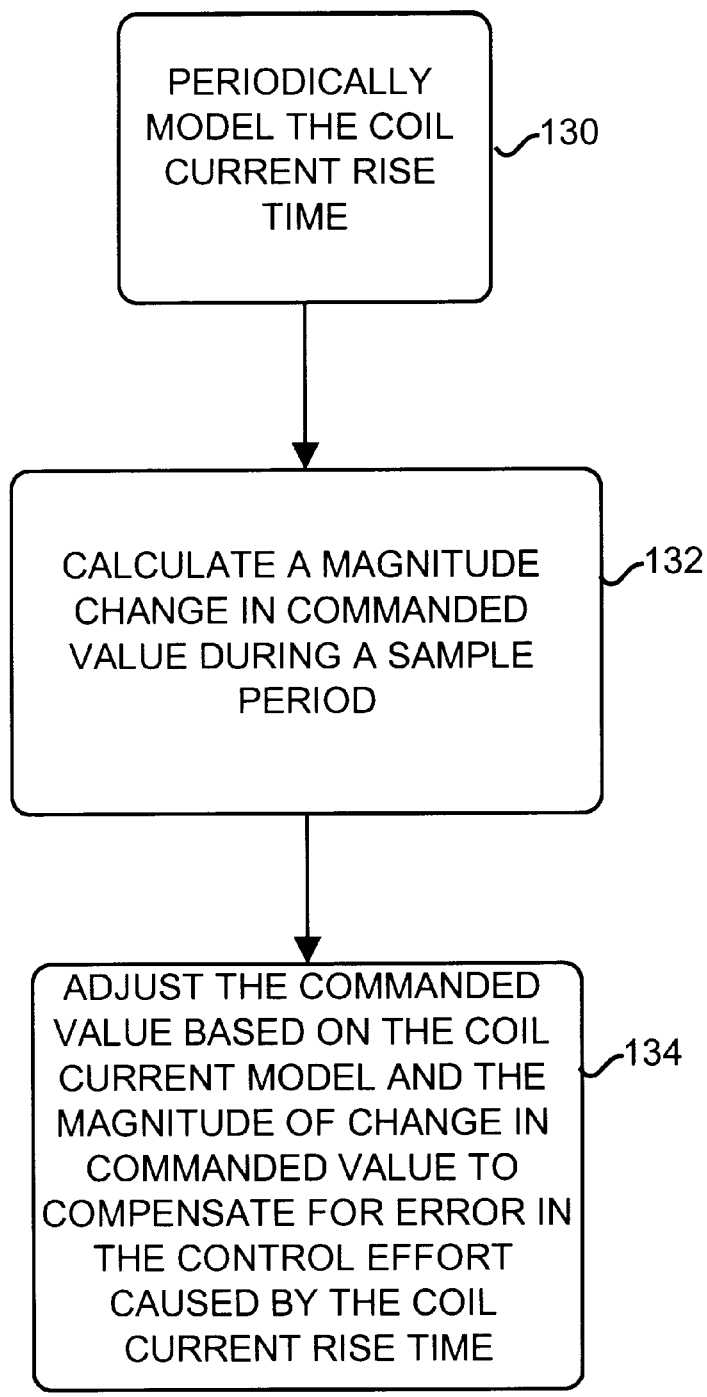
FIG. 5 shows a schematic diagram of the method of the invention to adaptively reduce error introduced by the coil current rise time.

Refer now to FIG. 5 which shows the method of the invention to adaptively reduce error caused by coil current rise time. In one embodiment of the invention the disk drive has an actuator with a voice coil motor having a coil of wire located in a magnetic field. The servo controller has an estimator and a current driver to generate a control effort to move the actuator. The coil of wire has an impedance which slows changes in current in the coil. The coil current has an associated rise time. The current driver of the actuator tries to force current in the coil to a commanded value. The control effort has an error caused by the coil current rise time. In step 130 the coil current rise time is periodically modeled. In step 132 a magnitude change in commanded value during a sample period is calculated. In step 134 the commanded value is adjusted based on the periodic modeling of the coil current rise time and the magnitude of change in the commanded value during the sample period to compensate for error in the control effort caused by the coil current rise time.

Figure 6A:
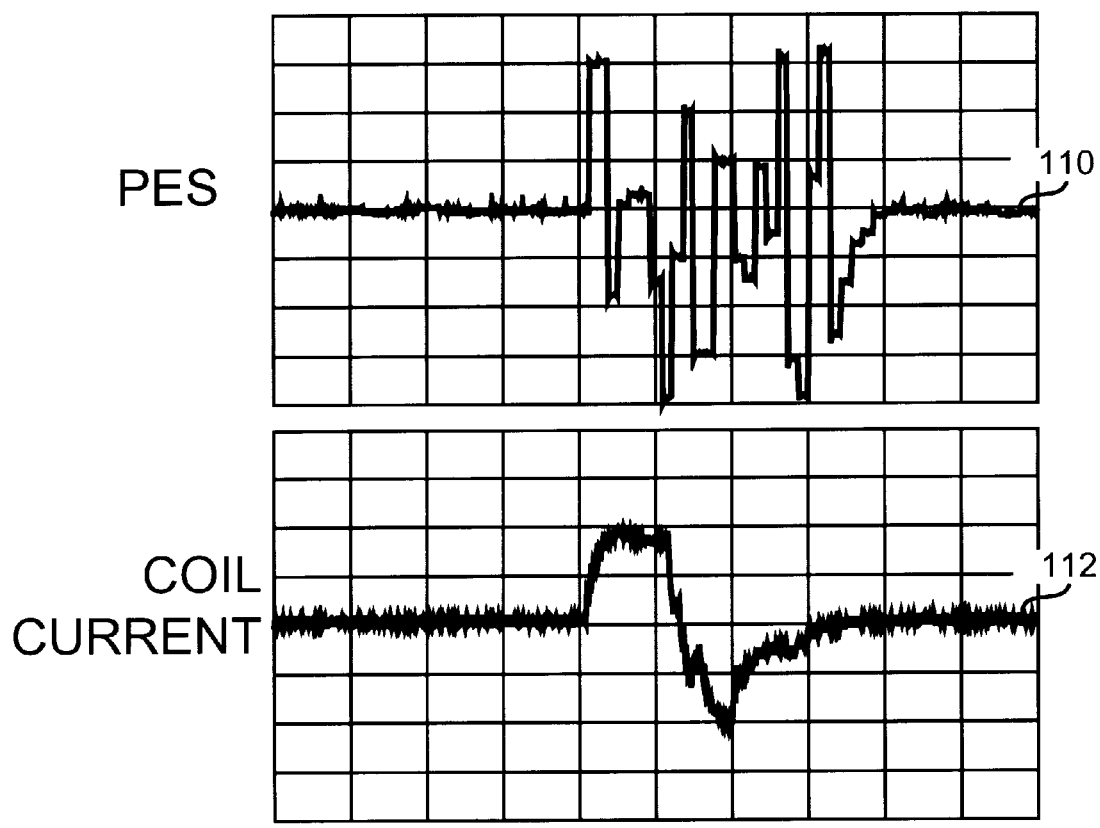
FIG. 6A shows a plot of coil current without the method of the invention operational.
Figure 6B:
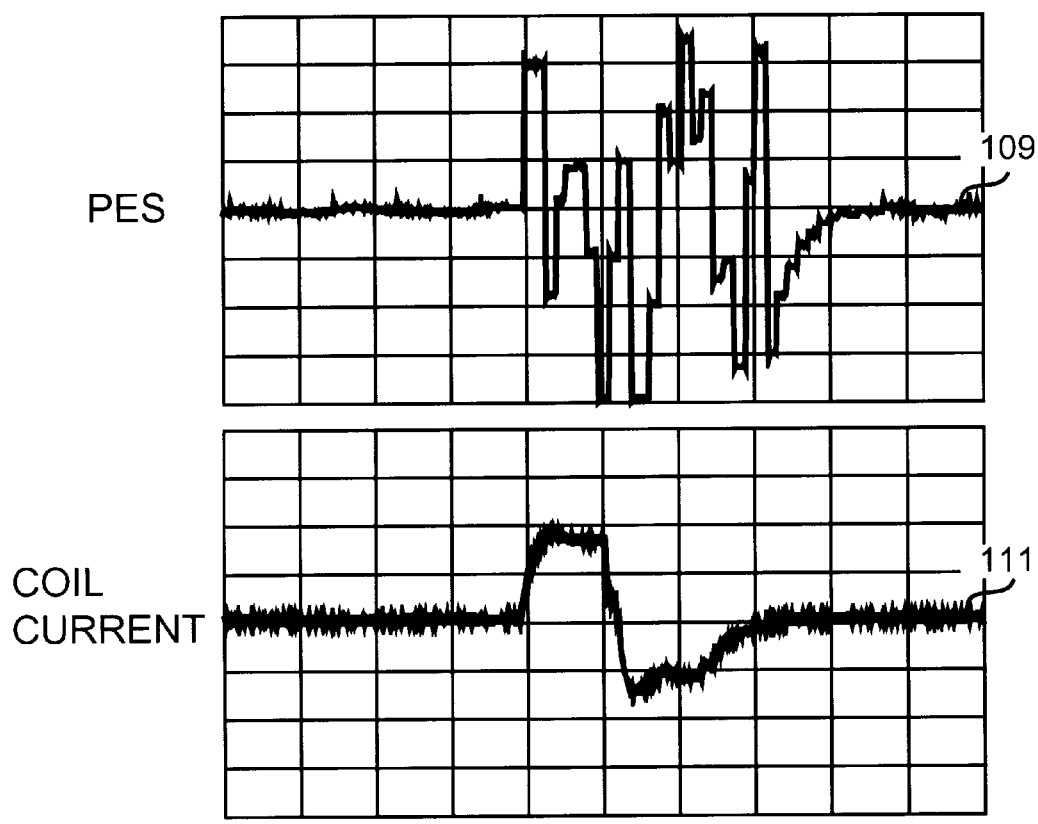
FIG. 6B shows a plot of coil current with the method of the invention operational.

Refer now to FIGS. 6A and 6B which show the position error signal 109 and 110 and VCM coil current 111 and 112 for a 350 track seek with, FIG. 6A, and without, FIG. 6A, the method of the invention active. The main difference is the length of saturation after the start of deceleration, shown improved in the plot of coil current 112 over the plot of coil current 111. Without the invention, the current is in saturation for a longer period of time, as shown in coil current 111. With the invention, the current is in the linear mode almost immediately, giving better estimates of velocity and better overall control.

Figure 7A:
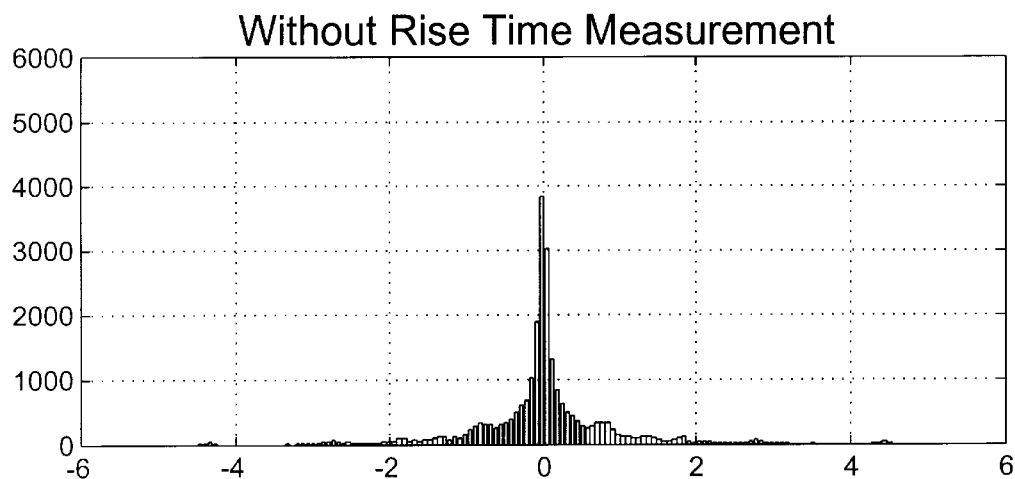
FIG. 7A shows a histogram of residual signal without the method of the invention.
Figure 7B:
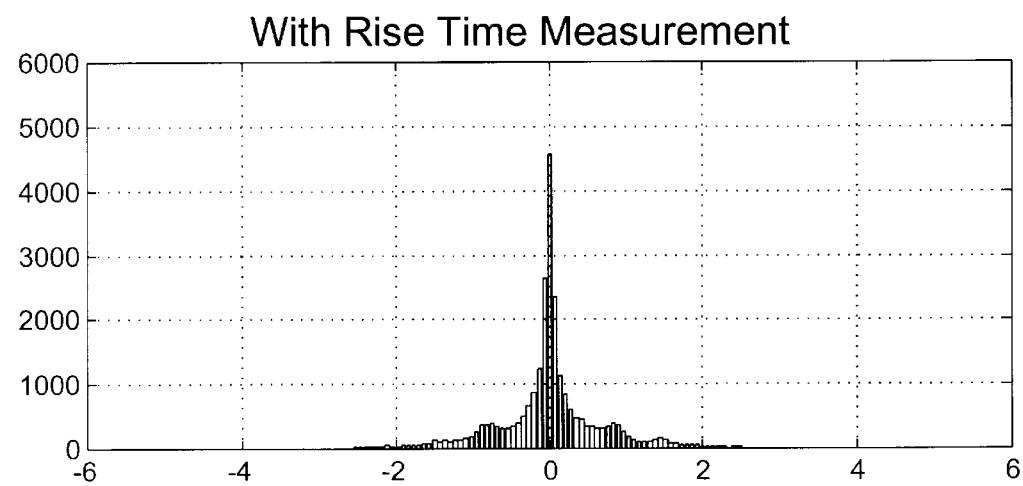
FIG. 7B shows a histogram of residual signal with the method of the invention.
Figure 8A:
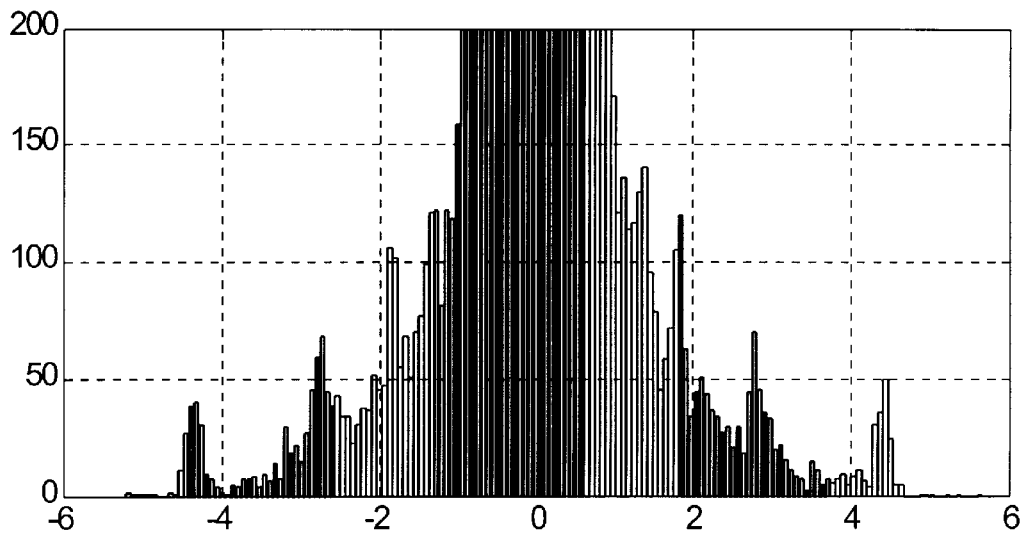
FIG. 8A shows a histogram of residual signal without the method of the invention at an expanded scale.
Figure 8B:
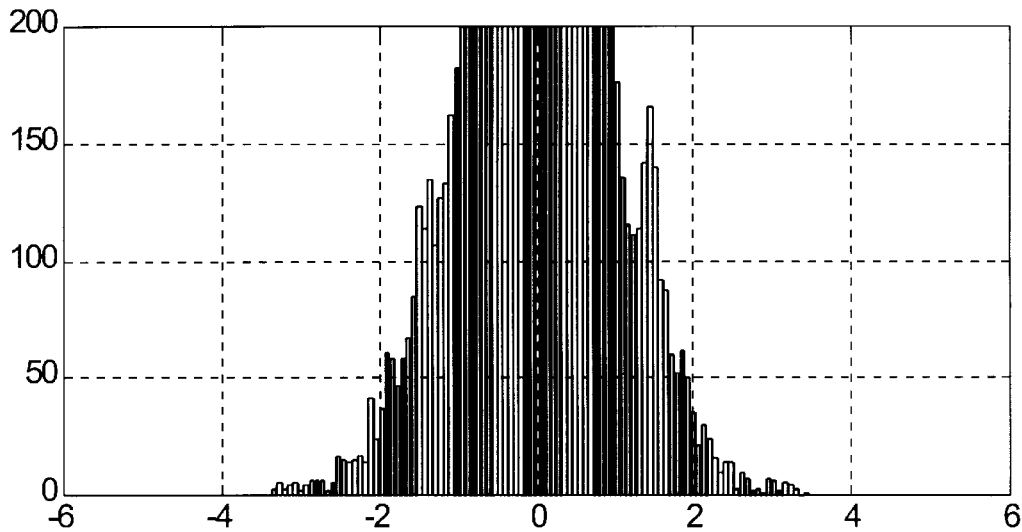
FIG. 8B shows a histogram of residual signal with the method of the invention at an expanded scale.

Refer now to FIGS. 7A, 7B, 8A and 8B which show a histogram of the residual value with and without the method of the invention active. The residual value is a measure of how well the algorithm model matches the hardware. The residual measures the error in tracks of the position error signal during seek accelerations and decelerations. During track follow, the residual is very close to zero. The y axis on FIGS. 7A, 7B, 8A and 8B show a count of the number of times the track error occurred. These measurements were taken during random seeks. The main source of error during seeking is the rise time, since the commanded current does not equal the actual current in the coil 26, and this shows up as a difference between the predicted and measured positions. FIGS. 7A and 7B show similar information as FIGS. 8A and 8B, where FIG. 8A is an expanded view of the center of FIG. 7A and FIG. 8B is an expanded view of the center of FIG. 7B. The expanded views show the improvement more clearly.

What is claimed is:

1. In a disk drive having an actuator with a voice coil motor having a coil of wire located in a magnetic field, a servo controller with an estimator and a current driver to generate a control effort to move the actuator, wherein the coil of wire has an impedance which slows changes in current in the coil, and the coil current has an associated rise time, wherein the current driver of the actuator tries to force current in the coil to a commanded value, and the control effort has an error caused by the coil current rise time, a method to adaptively reduce error caused by the coil current rise time comprising the steps of:

a) periodically modeling the coil current rise time;

b) calculating a magnitude of change in the commanded value during a sample period; and c) adjusting the commanded value based on the periodic modeling of the coil current rise time and the magnitude of change in the commanded value during the sample period to compensate for error in the control effort caused by the coil current rise time.

2. The method of claim 1 wherein the step of periodically modeling the coil current rise time further comprises the step of modeling the coil current rise time at a servo sample rate.

3. The method of claim 1 wherein the step of periodically modeling the coil current rise time further comprises the step of modeling the coil current as a resistor-inductor circuit describing the electrical dynamics of the coil of wire.

4. The method of claim 1 wherein the step of periodically modeling the coil current rise time further comprises the step of modeling the coil current according to the following equation:

a) $u(t) = \frac{2048}{1.1 g_m} \cdot \frac{(V_{ps} \pm K_e \omega)}{R}(1 - e^{-t/\tau}) = U Lim V(1 - e^{-t/\tau})$ b) where the units of u(t) are bits output;
c) $V_{ps}$ is the power supply voltage (Volts)
d) $K_e$ is the back emf constant (Volts/rad/sec)
e) $\omega$ is the actuator velocity (rad/sec)
f) R is the VCM coil resistance (ohms)
g) $g_m$ is the driver transconductance (Amps/volt)
h) 2048/1.1 is the dac gain (bits/volt); and
i) $\tau$ is the coil rise time (seconds).

5. The method of claim 1 wherein the step of adjusting the commanded value further comprises setting the adjustment to an estimated slope times a periodic sample rate plus an estimated offset.

6. The method of claim 1 wherein the step of adjusting the commanded value further comprises setting the adjustment based on the following equation:

$$\Delta u_{eff} = \Delta u(k)\left(1 - \frac{1}{2T_s}\left(\frac{|\Delta u(k)| - b}{slope}\right)\right)$$

$$= \frac{\Delta u(k)}{2T_s slope}(2T_s slope + b - |\Delta u(k)|)$$

where $\Delta u_{eff}$ is the effective change in the coil current;
$\Delta u(k)$ is equal to the difference between currently commanded current $u_a(k)$ and a previously commanded current $u_a(k-1)$;
$T_s$ is the servo sample rate;
b is an estimated intercept; and
slope is an estimated slope.

7. The method of claim 6 wherein the estimated intercept, b, is computed from the following equation b=0.1* [±ULimV−$u_a$(k−1)] where the 0.1 is a tunable parameter chosen graphically as an approximation and ULimV is a maximum attainable value of the coil current.

8. The method of claim 5 wherein the estimated slope is computed from the following equation $$\frac{d u_a(t)}{dt} = \frac{1}{\tau}[\pm U Lim V - u_a(k-1)]e^{-t/\tau}$$

where $\tau$ is the coil rise time,
ULimV is a maximum attainable value of the coil current, and
t is time.

9. The method of claim 1 wherein the disk drive is a magnetic hard disk drive.

10. The method of claim 1 further comprising the step of computing a velocity estimate of the actuator based on the model of the coil current rise time.

11. In a disk drive having an actuator with a voice coil motor having a coil of wire located in a magnetic field, a servo controller with an estimator and a current driver to generate a control effort to move the actuator, wherein the coil of wire has an impedance which slows changes in current in the coil, and the coil current has an associated rise time, wherein the current driver of the actuator tries to force the current in the coil to a commanded value, and the control effort has an error introduced by the coil current rise time, a method to adaptively reduce error introduced by the coil current rise time comprising the steps of a) computing a model limit based on the actuator velocity;
b) comparing the model limit to the absolute value of the commanded value;
c) computing an initial effective change in the commanded value based on the model limit if the model limit is less than the absolute value of the commanded value, otherwise computing the initial effective change the in commanded value based on the difference between the commanded value and a current value for a prior sample if the model limit is greater than or equal to the absolute value of the commanded value; and
d) computing a change in the commanded value based on a model of the voice coil motor if the initial effective change in the commanded value is greater than a predetermined current threshold and less than a maximum possible change in coil current.

12. The method of claim 11 wherein the step of computing a model limit further comprises computing the model limit based on a digital to analog converter gain, a driver transconductance, a power supply voltage, a back emf constant, an actuator velocity, and a voice coil resistance.

13. The method of claim 11 further comprising the step of computing the change in commanded value to one half of the maximum possible change in coil current if the initial effective change in commanded value is greater than the maximum possible change in coil current.

14. The method of claim 11 further comprising the step of setting the predetermined current threshold to less than 10% of the maximum possible change in coil current.

15. The method of claim 11 further comprising the step of setting the predetermined current threshold to less than 15% of the maximum possible change in coil current.

16. The method of claim 11 wherein the step of computing the change in commanded value based on a model of the voice coil motor further comprises modeling the coil of wire with a linear approximation.

17. The method of claim 16 wherein the model of the coil current rise time further comprises the following equation:

$$\Delta u_{\mathit{eff}} = \Delta u(k)\left(1 - \frac{1}{2T_s}\left(\frac{|\Delta u(k)| - b}{slope}\right)\right)$$

$$= \frac{\Delta u(k)}{2T_s slope}(2T_s slope + b - |\Delta u(k)|)$$

where $\Delta u_{\mathit{eff}}$ is the effective change in the coil current;

$\Delta u(k)$ is equal to the difference between currently commanded current $u_a(k)$ and a previously commanded current $u_a(k-1)$;

$T_s$ is the servo sample rate;

b is an estimated intercept; and slope is an estimated slope.

18. The method of claim 11 wherein the commanded value is modeled with the following equation where the model limit is ULimV:

a) $$u(t) = \frac{2048}{1.1 g_m} \cdot \frac{(V_{ps} \pm K_e \omega)}{R}(1 - e^{-t/\tau}) = ULimV(1 - e^{-t/\tau})$$

b) where the units of u(t) are bits output;

c) $V_{ps}$ is the power supply voltage (Volts)

d) $K_e$ is the back emf constant (Volts/rad/sec)

e) $\omega$ is the actuator velocity (rad/sec)

f) R is the VCM coil resistance (ohms)

g) $g_m$ is the driver transconductance (Amps/volt)

h) 2048/1.1 is the dac gain (bits/volt); and i) $\tau$ is the coil rise time (seconds).

19. The method of claim 17 wherein the estimated intercept, b, is computed from the following equation b=0.1* [±ULimV−$u_a$(k−1)] where the 0.1 is a tunable parameter chosen graphically as an approximation and ULimV is a maximum attainable value of the coil current.

20. The method of claim 18 wherein the estimated slope is computed from the following equation:

$$\frac{d u_a(t)}{dt} = \frac{1}{\tau}[\pm ULimV - u_a(k-1)]e^{-t/\tau}$$

where $\tau$ is the coil rise time,

ULimV is a maximum attainable value of the coil current, and t is time.

21. The method of claim 11 wherein the disk drive is a magnetic hard disk drive.

22. The method of claim 11 further comprising the step of computing an improved velocity estimate of the actuator.

23. In a disk drive having an actuator with a voice coil motor having a coil of wire located in a magnetic field, a servo controller with an estimator and a current driver to generate a control effort to move the actuator, wherein the coil of wire has an impedance which slows changes in current in the coil, and the coil current has an associated rise time, wherein the current driver of the actuator tries to force current in the coil to a commanded value, and the control effort has an error caused by the coil current rise time, a method to adaptively reduce the error caused by the coil current rise time comprising the steps of:

a) periodically modeling the coil current rise time;

b) modeling the coil current according to the following equation:

$$u(t) = \frac{2048}{1.1 g_m} \times \frac{(V_{ps} \pm K_e \omega)}{R}(1 - e^{-t/\tau}) = ULimV(1 - e^{-t/\tau})$$

where the units of u(t) are bits output;

$V_{ps}$ is the power supply voltage (Volts);

$K_e$ is the back emf constant (Volts/rad/sec);

$\omega$ is the actuator velocity (rad/sec);

R is the VCM coil resistance (ohms);

$g_m$ is the driver transconductance (Amps/volt);

$$\frac{2048}{1.1}$$

is the dac gain (bits/volt); and $\tau$ is the coil rise time (seconds); and c) calculating an adjustment to the commanded value based on the periodic modeling of the coil current rise time.

24. The method of claim 23 wherein the step of calculating an adjustment to the commanded value based on the periodic modeling of the coil current rise time is accomplished by setting the adjustment to an estimated slope times a periodic sample rate plus an estimated offset.

25. The method of claim 24 wherein the step of calculating an adjustment to the commanded value based on the model of the coil current rise time further comprises setting the adjustment based on the following equation:

$$\Delta u_{\mathit{eff}} = \Delta u(k)\left(1 - \frac{1}{2T_s}\left(\frac{|\Delta u(k)| - b}{slope}\right)\right)$$

$$= \frac{\Delta u(k)}{2T_s slope}(2T_s slope + b - |\Delta u(k)|)$$

where $\Delta u_{\mathit{eff}}$ is the effective change in the coil current;

$\Delta u(k)$ is equal to the difference between currently commanded current $u_a(k)$ and a previously commanded current $u_a(k-1)$;

$T_s$ is the servo sample rate;

b is an estimated intercept; and slope is an estimated slope.

26. The method of claim 25 wherein the estimated intercept, b, is computed from the following equation b=0.1* [±ULimV−$u_a$(k−1)] where the 0.1 is a tunable parameter chosen graphically as an approximation and ULimV is a maximum attainable value of the coil current.

27. The method of claim 25 wherein the estimated slope is computed from the following equation:

$$\frac{d u_a(t)}{dt} = \frac{1}{\tau}[\pm ULimV - u_a(k-1)]e^{-t/\tau}$$

where $\tau$ is the coil rise time,

ULimV is a maximum attainable value of the coil current, and t is time.

28. The method of claim 23 wherein the disk drive is a magnetic hard disk drive.

* * * * *